United States Patent

Hajzler

[11] Patent Number: 5,431,413
[45] Date of Patent: Jul. 11, 1995

[54] SEAL INCORPORATING AN ENCODER

[75] Inventor: Christian Hajzler, Rumilly, France

[73] Assignee: The Torrington Company, Torrington, Conn.

[21] Appl. No.: 55,610

[22] Filed: Apr. 30, 1993

[30] Foreign Application Priority Data

Jan. 19, 1993 [FR] France ............... 93 00458

[51] Int. Cl.⁶ .................. F16J 15/32; F16C 32/00
[52] U.S. Cl. .......................... 277/2; 277/38; 277/80; 277/152; 384/448; 384/485; 384/486
[58] Field of Search .............. 277/35, 37, 2, 80, 152, 277/38; 384/448, 484, 485, 486

[56] References Cited

U.S. PATENT DOCUMENTS

| | | |
|---|---|---|
| 3,028,203 | 4/1962 | Lund et al. ............ 277/37 X |
| 4,171,818 | 10/1979 | Moskowitz ............ 277/80 |
| 4,792,243 | 12/1988 | Takeuchi et al. ............ 384/486 |
| 4,850,722 | 7/1989 | Bayer . |
| 4,946,296 | 8/1990 | Olschewski et al. . |
| 4,948,277 | 8/1990 | Alff . |
| 4,991,982 | 2/1991 | Colanzi et al. ............ 277/371 X |
| 5,042,822 | 8/1991 | Dreschmann et al. ......... 384/486 X |

FOREIGN PATENT DOCUMENTS

| | | |
|---|---|---|
| 0371836 | 6/1990 | European Pat. Off. . |
| 378939 | 7/1990 | European Pat. Off. ............ 384/448 |
| 388258 | 9/1990 | European Pat. Off. ............ 384/485 |
| 2574501 | 6/1986 | France . |
| 0495323 | 7/1992 | France . |
| 21219 | 1/1989 | Japan ................. 384/448 |
| 1642160 | 4/1991 | U.S.S.R. ............... 277/152 |

Primary Examiner—William A. Cuchlinski, Jr.
Assistant Examiner—Scott W. Cummings
Attorney, Agent, or Firm—John C. Bigler

[57] ABSTRACT

A disk mountable on a rotating support has one side at least partially covered with an elastomer loaded with magnetic particles to form an encoder while the other side of said disk axially limits an annular chamber. A sealing structure attached to the disk and contained within the plane of a lateral side of a support capable of supporting a non-rotating component of the seal with incorporated encoder is mountable within an annular cavity which is axially limited by the plane.

12 Claims, 3 Drawing Sheets

_5,431,413_

1

SEAL INCORPORATING AN ENCODER

BACKGROUND OF THE INVENTION

This invention relates generally to encoder mounting devices and, more particularly, to a seal incorporating an encoder with multipolar magnetization for generating a magnetic field.

Document EP A 495323 describes a seal which has a rotating deflector covered by or made of a magnetized material.

When the operation of a particular sensor requires a strong magnetic field, the axial space requirement of the encoder must be increased. According to document FR A 2660975, the internal side of a rotating disk is oriented toward a sealing fixture, while the external side of the disk supports an encoder. The total axial dimension of such a seal does not allow sealing of bearings whose axial space requirements are determined in advance.

The foregoing illustrates limitations known to exist in present devices and methods. Thus, it is apparent that it would be advantageous to provide an alternative directed to overcoming one, or more of the limitations set forth above. Accordingly, a suitable alternative is provided including features more fully disclosed hereinafter.

SUMMARY OF THE INVENTION

In one aspect of the invention, this is accomplished by providing a seal with incorporated encoder. A disk mountable on a rotating support has an elastomer loaded with magnetic particles covering at least a portion of a first side of the disk to provide an encoder while the second side of the disk axially limits an annular chamber. A sealing means attached to the disk is contained within the plane of a lateral side of a support capable of supporting a non-rotating element of the seal mountable in an annular cavity axially limited by said plane.

The foregoing and other aspects of the invention will become apparent from the following detailed description thereof when considered, in conjunction with the accompanying drawing figures.

BRIEF DESCRIPTION OF THE DRAWING FIGURES

2

DETAILED DESCRIPTION

Figure 1:
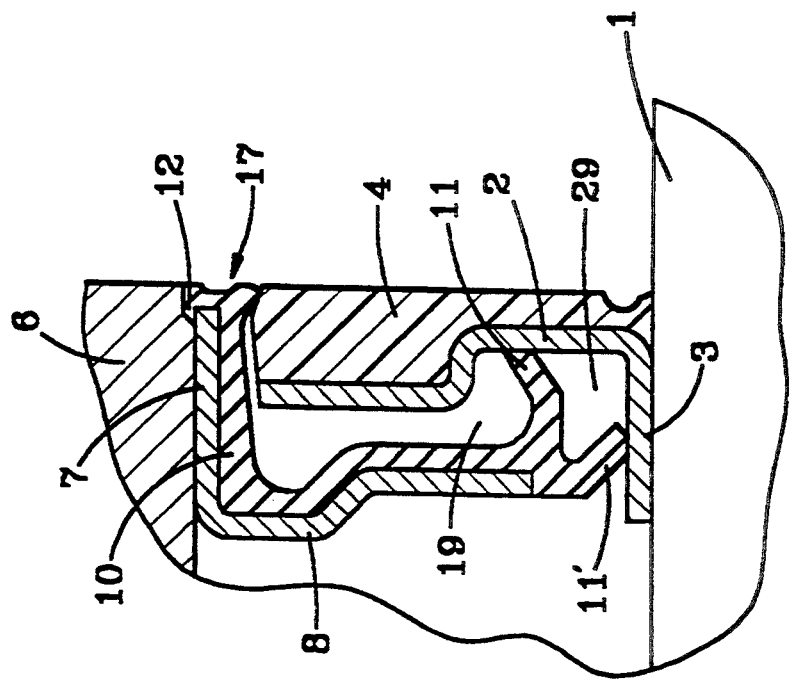
FIG. 1 is a radial cross-sectional view of a seal with incorporated encoder mounted on a rotatable shaft, illustrating an embodiment of the present invention.
Figure 2:
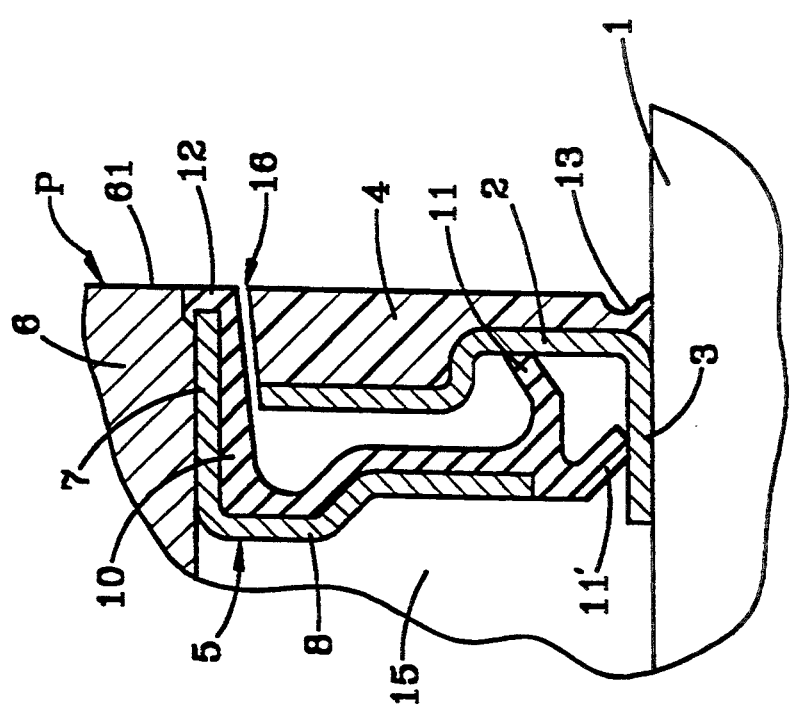
FIG. 2 is a radial cross-sectional view similar to FIG. 1 illustrating a second embodiment of the Seal with incorporated encoder of the present invention.

Referring now to the drawings, FIGS. 1 and 2 show a rotating support shaft 1 supporting a radial disk 2 which is firmly attached to a cylindrical bearing surface 3 which is fitted to shaft 1. One side of disk 2 is covered with an elastomer loaded with magnetic particles, the elastomer and magnetic particles being designated as an encoder element 4. Disk 2 can also be made of a magnetic material for the purpose of ensuring a concentration of the field and of the magnetic flux emitted by encoder element 4.

Disk 2 and cylindrical bearing surface 3 together constitute an internal reinforcement located within a fixed external reinforcement 5, mounted on a support 6. External reinforcement 5 also has a mounting bearing surface 7 flush-fit in support 6 and a fixed radial disk 8 oriented toward the axis of rotation of shaft 1.

Disk 8 has an elastomeric coating 10 which has an axial lip 11 and a radial lip 11' bearing against the free side of disk 2 and against the external surface of bearing surface 3, respectively, for sealing the bearing. The boundary of coating 10 connected to mounting bearing surface 7 has a circular rib 12 flush-fit in a countersink or on a chamfer of support 6. The external lateral surface of disk 2 is connected to a radial sealing lip 13 merging with shaft 1 and contained within the plane P of lateral side 61 of support 6.

Disks 2 and 8, encoder element 4, and elastomeric coating 10 are mounted within an annular cavity 15 which is axially limited by the plane P. In the embodiment of FIG. 1, the peripheral surfaces of disk 2 and encoder element 4 are separated radially from elastomeric coating 10 by an interstice 16. However, the peripheral surfaces of disk 2 and encoder element 4 can be flush-fit under a fixed sealing lip 17 supported by coating 10 and in contact with encoder element 4, as shown in FIG. 2.

Moreover, disks 2 and 8 of FIG. 2 delimit annular cavities 19 and 29 which may be filled with a magnetic liquid kept in place by the magnetism of encoder element 4. This liquid may also be contained within the interstice 16. The presence of liquid loaded with ferrite improves the sealing property of the seal. The encoder incorporated with the seal should however have a sufficiently large volume so that the magnetic field can be read easily by a sensor.

FIGS. 3 through 7 illustrate variations of the seal with incorporated encoder illustrated in FIGS. 1 and 2. The elements and parts of the assembly shown in FIGS. 3 through 7 whose functions correspond to the elements and parts illustrated in FIGS. 1 and 2 are consequently identified by the same reference numerals. In each of the embodiments, the external lateral side of encoder 4 essentially merges with plane P of the lateral side of outer ring 30 supporting disk 8.

Figure 3:
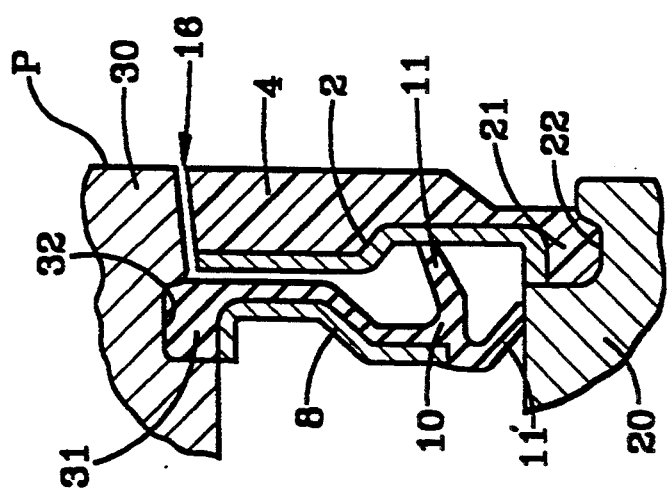
FIG. 3 is a radial cross-sectional view similar to FIG. 1 illustrating a flush-fit seal rib with encoder between outer and inner rings of a rolling bearing.
Figure 4:
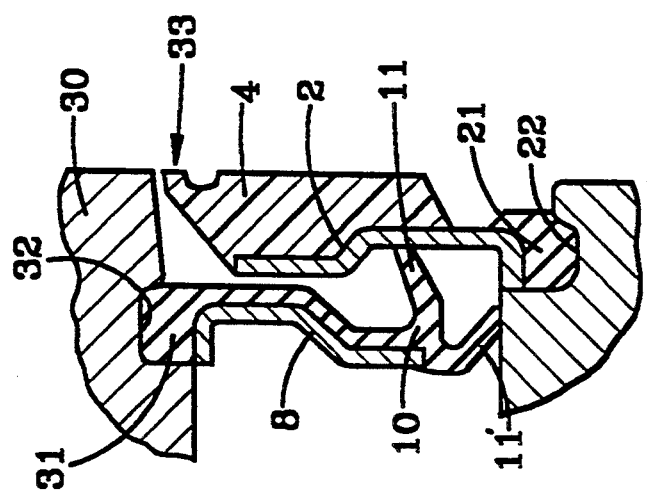
FIG. 4 is a radial cross-sectional view illustrating a fourth embodiment of the present invention similar to that of FIG. 3.

The seal illustrated in FIGS. 3 and 4 is mounted in a cavity delimited between the support rings, that is, rotating inner ring 20 and fixed outer ring 30 of a bearing with rolling elements. For this purpose, encoder element 4 on disk 2 is limited radially in its internal diameter by an annular sealing rib 21 intended for the mounting of encoder element 4 in an annular groove 22 of inner ring 20. In a similar manner, elastomeric coating 10 on disk 8 is limited radially at its external diameter by an annular sealing rib 31 intended for the mounting of disk 8 in an annular groove 32 of outer ring 30.

According to FIG. 3, the peripheral surface of the encoder-disk combination 2,4 is separated radially by an interstice 16 from outer ring 30 of the bearing. According to FIG. 4, the axial dimensions of interstice 16 are limited by a lip 33 which extends radially outward at the perimeter of encoder 4. Annular rib 21 consists of an elastomer which is not loaded with ferrite.

Figure 5:
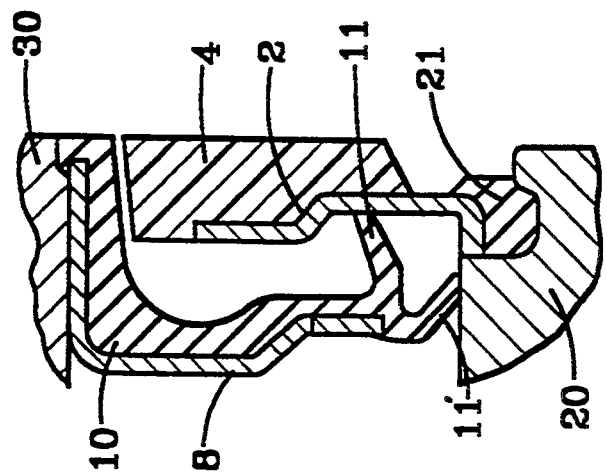
FIG. 5 is a radial cross-sectional view illustrating a fifth embodiment of the present invention similar to that of FIG. 3.

FIG. 5 illustrates an embodiment of the present invention corresponding to the structure described with reference to FIG. 3 and in which annular sealing rib 21 consists of an elastomer which is not loaded with ferrite. In the embodiment of FIG. 5, disk 8, which supports elastomeric coating 10 and includes sealing lips 11,11' corresponds to the structure described with reference to FIG. 1 in which radial lip 11' bears, for example, against rotating inner ring 20 of a bearing.

Figure 6:
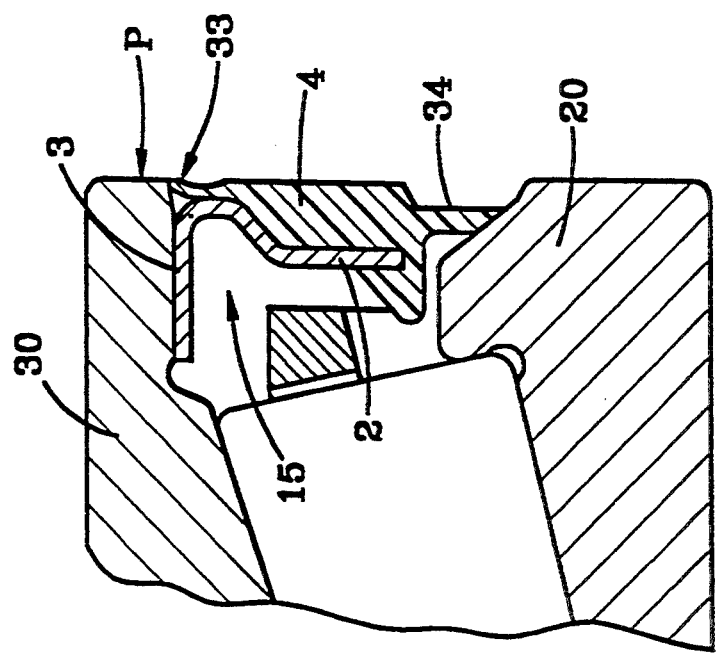
FIG. 6 is a radial cross-sectional view similar to FIG. 1 illustrating a simplified sixth embodiment of the present invention.

FIG. 6 illustrates a simplified embodiment of the present invention which is mounted on a fixed inner ring 20 and a rotating outer ring 30 of a rolling bearing. Disk 2 is extended to the outside by mounting cylindrical bearing surface 3 in cavity 15 delimited between inner and outer rings 20,30 and the plane P of the lateral side of the bearing. Encoder element 4 supports an external radial sealing lip 33 in contact with a cylindrical bore of outer ring 30 and radial lip 34 in contact with a conical bearing surface of inner ring 20.

Figure 7:
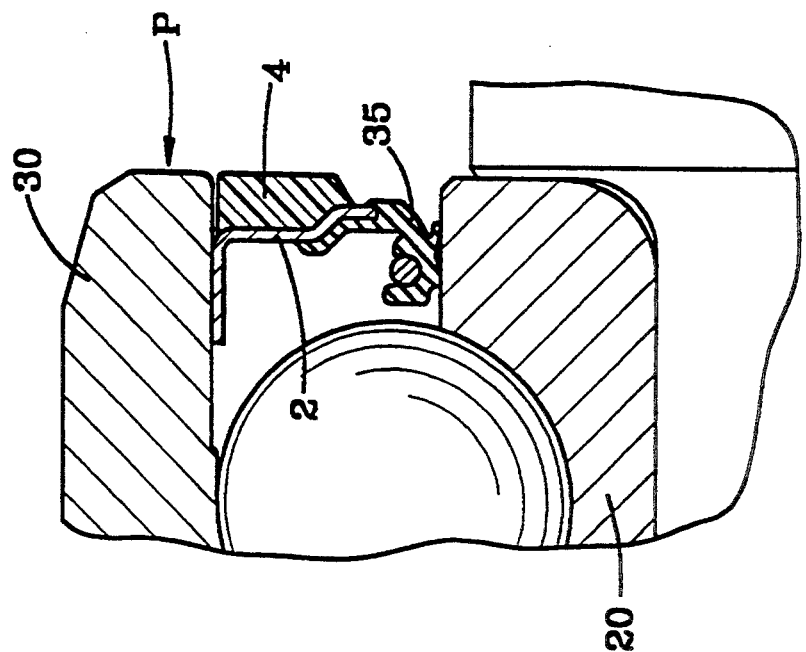
FIG. 7 is a radial cross-sectional view illustrating a seventh embodiment of the present invention similar to that of FIG. 6.

FIG. 7 illustrates a simplified embodiment of the present invention similar to that of FIG. 6 between a fixed inner ring 20 and a rotating outer ring 30 of a rolling bearing. In this example, a lateral side of encoder element 4 essentially merges with the plane P of the lateral side of the bearing. Disk 2 supports an elastomeric seal, which is of a known type, with two radial lips 35, bearing against inner ring 20 due to the action of a spring.

The present invention thus provides a rolling bearing with an encoder mounting means such that the axial position of the seal has no effect on the overall dimension of the bearing. The invention also provides a rolling bearing seal whose sealing property is improved at the connections with the fixed and mobile elements of the bearing. In addition, the invention provides a compact seal assembly comprising a sealing fixture with flexible lips whose incorporated encoder can easily be manufactured from an elastomer loaded with ferrite particles.

Having described the invention, what is claimed is:

1. A seal with incorporated encoder comprising:
   a disk, mountable on a rotating support, the disk having a first surface and a second surface offset axially outwardly of the first surface, the first surface being on a first side of the disk;
   an elastomer loaded with magnetic particles covering at least a portion of the first surface of the disk while the second side of said disk axially limits an annular chamber, the elastomer with magnetic particles comprising an encoder; and
   sealing means in contact with the second surface of the disk; the disk, encoder and first sealing means all being contained within the plane of a lateral side of a support capable of supporting a non-rotating element of the seal.

2. The seal with incorporated encoder according to claim 1, wherein the seal includes a second sealing means, said second sealing means comprising at least one radial lip.

3. The seal with incorporated encoder according to claim 1, wherein the seal includes a second sealing means, said second sealing means comprising an annular mounting rib in contact with a groove of the rotating support.

4. The seal with incorporated encoder according to claim 3, wherein the mounting rib consists of an elastomer which is not loaded with magnetic particles and which is separated from the encoder.

5. The seal with incorporated encoder according to claim 1, wherein the peripheral surface of the combination of the disk and the encoder is limited radially by an interstice.

6. The seal with incorporated encoder according to claim 1, wherein the peripheral surface of the combination of the disk and the encoder is flush-fit under a fixed sealing lip in contact with the encoder.

7. The seal with incorporated encoder according to claim 1, wherein at least said annular chamber contains a magnetic liquid.

8. The seal with incorporated encoder according to claim 5, wherein the interstice limiting the peripheral surface of said subassembly contains a magnetic liquid.

9. The seal with incorporated encoder according to claim 1, wherein the disk includes a radially directed portion made of a magnetic material for the concentration of the magnetic flux delivered by said encoder.

10. The seal with incorporated encoder according to claim 1, wherein the first sealing means comprises a non-rotating sealing lip supported by said non-rotating element of the seal and engageable with the second surface of the disk to provide a seal.

11. The seal with incorporated encoder according to claim 1, wherein the first sealing means comprises a rotating sealing lip supported by the second surface of the disk and engageable with a non-rotating bearing ring, the non-rotating bearing ring comprising said non-rotating element of the seal.

12. The seal with incorporated encoder according to claim 1, wherein the elastomer further comprises an extension such that sealing is enhanced between the disk and the rotating support.

* * * * *